United States Patent
Morley (10) Patent No.: US 10,591,606 B2
(45) Date of Patent: Mar. 17, 2020

(54) SYSTEM AND METHOD FOR GENERATING A PHASE SCINTILLATION MAP UTILIZED FOR DE-WEIGHTING OBSERVATIONS FROM GNSS SATELLITES

(71) Applicant: NovAtel Inc., Calgary (CA)

(72) Inventor: Thomas Morley, Calgary (CA)

(73) Assignee: NovAtel Inc., Calgary, AB (CA)

(*) Notice: Subject to any disclaimer, the term of this patent is extended or adjusted under 35 U.S.C. 154(b) by 255 days.

(21) Appl. No.: 15/679,758

(22) Filed: Aug. 17, 2017

(65) Prior Publication Data
US 2019/0056505 A1 Feb. 21, 2019

(51) Int. Cl.
G01S 19/07 (2010.01)
G01S 19/08 (2010.01)
G01S 19/43 (2010.01)
G01S 19/05 (2010.01)

(52) U.S. Cl.
CPC ............ *G01S 19/08* (2013.01); *G01S 19/05* (2013.01); *G01S 19/07* (2013.01); *G01S 19/43* (2013.01)

(58) Field of Classification Search
CPC .......... G01S 19/04; G01S 19/05; G01S 19/07; G01S 19/08; G01S 19/43
USPC ................................................... 342/357.26
See application file for complete search history.

(56) References Cited

U.S. PATENT DOCUMENTS

| 9,405,012 B2 | 8/2016 | Doucet et al. |
| 2015/0226855 A1 | 8/2015 | Averin et al. |
| 2015/0253431 A1 | 9/2015 | Averin et al. |

FOREIGN PATENT DOCUMENTS

| WO | 2016034252 | 3/2016 |
| WO | 2016185500 | 11/2016 |

OTHER PUBLICATIONS

L.F.C. De Rezende et al., "Mapping and Survey of Plasma Bubbles over Brazilian Territory" Journal of Navigation, vol. 60, No. 01, Jan. 1, 2007, pp. 69-81.

Vani Bruno Cesar et al. "Visual exploration and analysis of ionospheric scintillation monitoring data: The ISMR Query Tool" Computer and Geosciences, Pergamon Press, Oxford, GB, vol. 104, Aug. 26, 2016, pp. 125-134.

(Continued)

*Primary Examiner* — Dao L Phan
(74) *Attorney, Agent, or Firm* — Cesari and McKenna, LLP (57) ABSTRACT

A system and method generates a phase scintillation map that is utilized to de-weight satellite signal observations from GNSS satellites. One or more base stations each assign an index value to one or more GNSS satellite in view, where the index value indicates an adverse effect of ionospheric scintillation on signals received from the GNSS satellite. The values and identifiers may be transmitted to a server. The server utilizes the received information to generate the phase scintillation map that may include one or more scintillation bubbles, wherein a location of each scintillation bubble is based on the received information. The phase scintillation map is transmitted to one or more rovers. The rover determines if a pierce point associated with a selected GNSS satellite in view of the rover falls within the boundaries of a scintillation bubble. If so, satellite signal observations from the selected GNSS satellite are de-weighted.

16 Claims, 5 Drawing Sheets

(56) References Cited

OTHER PUBLICATIONS

Caamano Maria et al., "Multi-constellation GBAS: How to Benefit from a Second Constellation" Plans 2016—Proceedings of IEEE/ION Plans 2016, The Institute of Navigation, 855 Rixlew Lane Suite 360 Manassas, VA 20109, Apr. 14, 2016, pp. 833-841.
Extended European Search Report dated Jan. 25, 2019 for European Application No. 18178523.9 for NovAtel, Inc., 12 Pages.
Shanmugam et al., "Evolution to Modernized GNSS Ionospheric Scintillation and TEC Monitoring" IEEE/ION Plans—Apr. 24-26, 2012, Myrtle Beach, SC, Session B2A, 9 pages.

| Base Station Identifier | GNSS Satellite Identified | Pierce Point Location | Assigned Index Value | Frequency |
|---|---|---|---|---|
| Base Station A | Satellite A | $x_1, y_1, z_1$ | 5 | L1 |
| Base Station B | Satellite A | $x_2, y_2, z_2$ | 3 | L1 |
| Base Station B | Satellite B | $x_3, y_3, z_3$ | 0 | L1 |
| ... | | | | |

SYSTEM AND METHOD FOR GENERATING A PHASE SCINTILLATION MAP UTILIZED FOR DE-WEIGHTING OBSERVATIONS FROM GNSS SATELLITES

BACKGROUND

Technical Field

The invention relates generally to global navigation satellite systems (GNSS), and in particular, to a system that generates a phase scintillation map that is utilized for de-weighting satellite signal observations from GNSS satellites.

Background Information

The ionosphere is a layer of the Earth's atmosphere that is ionized by solar and cosmic radiation and typically lies 75-1000 km (46-621 miles) above the Earth's surface. Particular portions or regions of the ionosphere, known as scintillation bubbles, are susceptible to ionospheric scintillation which causes radio-frequency signals passing through the scintillation bubble to experience rapid fluctuations in phase and/or amplitude. Specifically, global navigation satellite system (GNSS) satellite signals interact with free electrons along the propagation path through the scintillation bubble causing phase errors, rapid phase fluctuations and/or signal power fading in the received signals, which may result in cycle slips and possible loss of lock at a GNSS receiver and lead to a degradation in overall positioning accuracy.

To account for the adverse effects associated with the ionosphere, traditional approaches may de-weight satellite signal observations (e.g., pseudorange measurements and phase measurement) based on GNSS satellite elevation and/or GNSS signal carrier-to-noise-density ratio ($C/N_0$). However, elevation and/or the $C/N_0$ may not be a good predictor of which of the GNSS satellite signals are being adversely affected by the ionosphere.

SUMMARY

The inventive system and method generates a phase scintillation map that is utilized for de-weighting satellite signal observations. Specifically, each base station receives satellite signals from one or more global navigation satellite systems (GNSS) satellites that are in view of the base station. The base station determines to what extent the signals received from a GNSS satellite are being adversely affected by atmospheric conditions, specifically, by ionospheric scintillation. For example, the base station may assign an index value to a GNSS satellite indicative of the adverse effect of ionospheric scintillation on satellite signals transmitted by the GNSS satellite. Specifically, the index value may indicate to what extent the satellite signals, from the GNSS satellite, are being adversely affected by ionospheric scintillation from a scintillation bubble in the ionosphere. The base station then transmits the index value and other information to a central server. The other information may include the coordinates of a pierce point. As used herein, the coordinates of a pierce point indicate a location where the satellite signals transmitted by the GNSS satellite and received by the receiver intersect with the ionosphere.

The central server utilizes the information received from the base stations to generate a phase scintillation map that may include one or more scintillation bubbles. Specifically, the central server generates the phase scintillation map for a particular geographical location, wherein the phase scintillation map may include scintillation bubbles that are placed at particular locations on the phase scintillation map based on the received information. For example, the coordinates of one or more pierce points determined by the base stations and the index values assigned by the base stations are utilized to determine the locations of the scintillation bubbles on the phase scintillation map.

The central server then transmits the generated phase scintillation map to one or more rovers. Each rover may then determine if a pierce point that is associated with satellite signals for a given GNSS satellite in the view of the rover has coordinates that fall within the boundaries of a scintillation bubble on the phase scintillation map. If the coordinates of the pierce point fall within the boundaries of the scintillation bubble, the satellite signal observations associated with the given GNSS satellite may be de-weighted by the rover.

Advantageously, when performing position calculations, the satellite signal observations (e.g., pseudorange measurements and phase measurement) from GNSS satellites that have corresponding pierce points that do not fall within the boundaries of a scintillation bubble are utilized instead of or prioritized over the satellite signal observations calculated from the GNSS satellites signals that are associated with pierce points that fall within the boundaries of a scintillation bubble.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
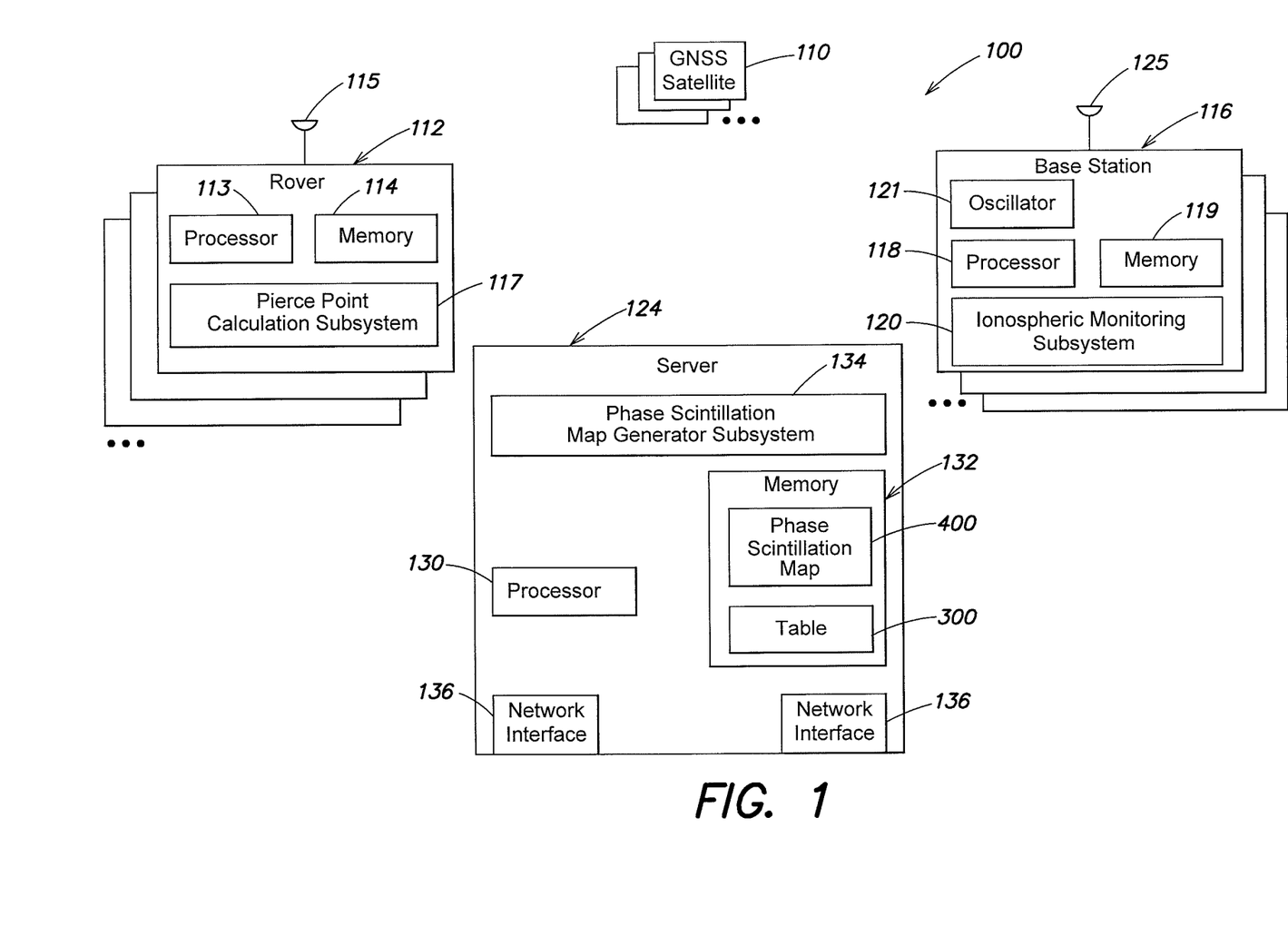
FIG. 1 illustrates a system in accordance with an illustrative embodiment of the invention.

Referring to FIG. 1, a system 100 includes one or more rovers 112, one or more base stations 116, and a central server 124. The rovers 112 and base stations 116 may operate as part of a real time kinematic (RTK) system and/or a Precise Point Positioning (PPP) system over a wired or wireless network (not shown), as known by those skilled in the art.

The one or more base stations 116 are typically stationary, have known positions and essentially clear views of the sky. Each base station 116 includes an antenna 125 that receives global navigation satellite system (GNSS) satellite signals from one or more GNSS satellites 110 in view of the base station 116. In addition, the base station 116 includes one or more processors 118, a memory 119, and an oscillator 121, such as an Ovenized Crystal Oscillator (OXCO). It is noted that although oscillator 121 is depicted as being a separate component within the base station 116, it is expressly contemplated that the oscillator 121 may be part of ionospheric monitoring subsystem 120. The one or more processors 118 may operate in a known manner to acquire and track the GNSS satellite signals, make carrier and phase observations, determine pseudoranges, and determine correction information as known by those skilled in the art.

The base station 116 may output, in a known manner, a variety of signal measurements and statistics useful for characterizing the local ionospheric condition. Specifically, the base station 116 may sample raw amplitude and phase of each tracked GNSS signal at a particular rate (e.g., 50 Hz). The raw amplitude and phase along with the raw total electron content (TEC) measurements, which are computed from a combination of multiple frequencies, are then processed, in a known manner, to produce summary logs of scintillation index values and TEC. The base station 116 may calculate, in a known manner, an amplitude scintillation index (S4) value, a phase scintillation index ($\sigma_\varphi$) value, and the TEC. S4 and $\sigma_\varphi$ may be computed for each frequency that base station 116 tracks (e.g., L1, L2, and L5). Higher values of S4 and/or $\sigma_\varphi$ can be attributed to, for example, an atmospheric condition, such as, ionospheric scintillation from a scintillation bubble in the ionosphere.

S4 is dimensionless and defined as the square root of the normalized variance of signal intensity over a defined period of time. An S4 value of 0.6 or higher may be associated with strong scintillation, while an S4 value of 0.3 or lower may be associated with weak or no scintillation (e.g., conditions unlikely to have any noticeable impact on receiver performance).

$\sigma_\varphi$ is the standard deviation of the received signal phase over a defined period of time and measured in radians or degrees. For example, $\sigma_\varphi$ may be computed over a plurality of different time intervals. A $\sigma_\varphi$ value of 1 radian or higher may be associated with strong scintillation, while a $\sigma_\varphi$ value of 0.1 radians or lower may be associated with weak or no scintillation. In addition, although the base station 116 need not transmit the scintillation information to the rover 112, the base station 116 may transmit scintillation information such as the S4 value, the $\sigma_\varphi$ value, and/or correction information to the rovers 112 in the form of one or more RTK messages and/or PPP messages as known by those skilled in the art.

The one or more processors 118 are configured to execute the ionospheric monitoring subsystem 120 that is configured to operate in accordance with one or more embodiments described herein. Specifically, and as described in further detail below, the ionospheric monitoring subsystem 120 may calculate one or more of the S4, the $\sigma_\varphi$, and/or the TEC values to indicate to what extent the satellite signals from each GNSS satellite 110 in view of the base station 116 are being adversely affected by the atmospheric condition, and specifically, ionospheric scintillation. For example, the ionospheric monitoring subsystem 120 may assign to a GNSS satellite 110, based on the S4 or the $\sigma_\varphi$ values, alone or in combination with the TEC value, an index value indicating to what extent ionospheric scintillation is adversely affecting the signals from the GNSS satellite 110. The one or more index values and other values, as described in further detail below, may be stored in the memory 119 and then transmitted from the base station 116 to the central server 124 using a variety of different types of messages. For example, the index values may be broadcast to the central server 124 and/or transmitted to the central server 124 utilizing any of a variety of types of messages.

The central server 124 includes one or more processors 130, a memory 132, and one or more network interfaces 136. The network interfaces 136 contain the mechanical, electrical, and signaling circuitry for communicating with the rovers 112 and base stations 116 over a wired or wireless network (not shown).

Figure 3:
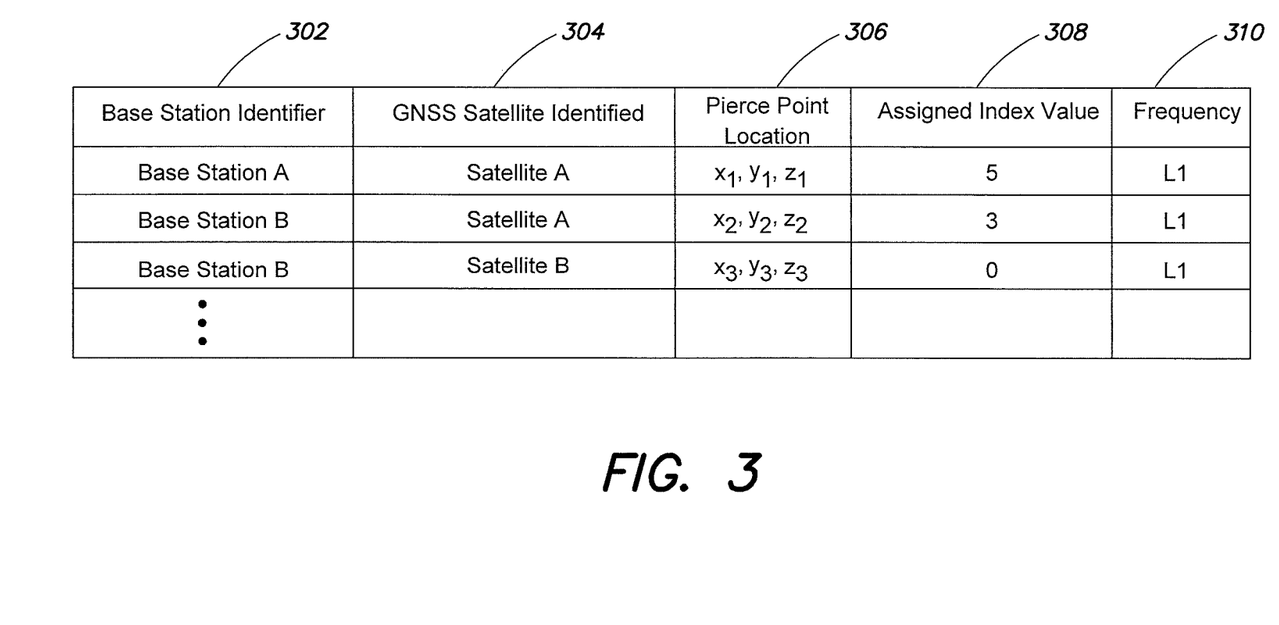
FIG. 3 illustrates an exemplary table that may store values associated with the operation of the system of FIG. 1.
Figure 4:
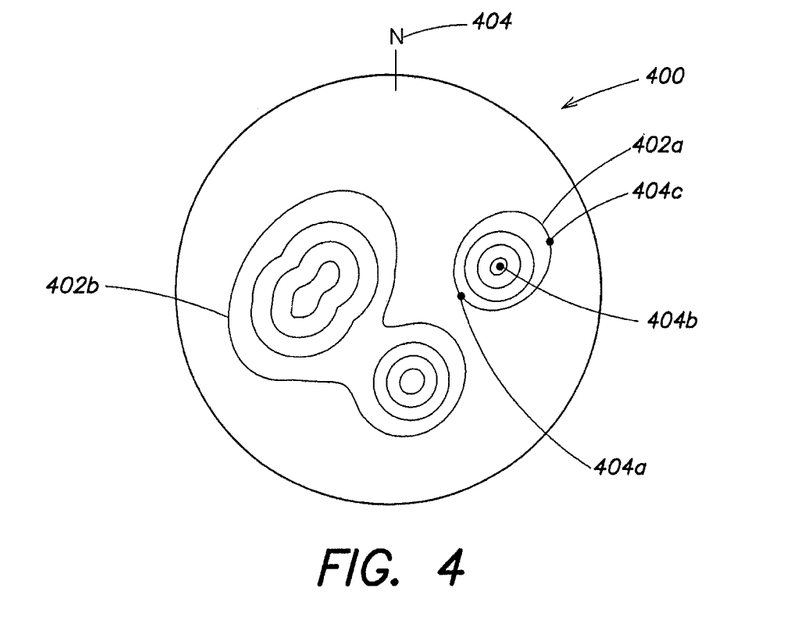
FIG. 4 illustrates an exemplary phase scintillation map associated with the operation of the system of FIG. 1.

The one or more processors 130 execute a phase scintillation map generator subsystem 134 configured to generate a phase scintillation map 400 in accordance with one or more embodiments described herein. In addition, the memory 132 may store a table 300, which contains one or more values received from the base stations 116. In addition or alternatively, the table 300 may be stored in storage (not shown) that is coupled to and external to the central server 124. The storage coupled to and external to the central server 124 may be, but is not limited to, a database, storage device such as hard disk drives (HDDs), and/or storage devices such as solid state drives (SSDs). The phase scintillation map generator subsystem 134 may utilize the values stored in the table 300 to generate the phase scintillation map 400, as described in further detail below. In addition, the phase scintillation map may be transmitted from the central server 124 to one or more rovers 112. For example, the phase scintillation map 400 may be broadcast to the one or more rovers 112 and/or transmitted to the one or more rovers 112 utilizing any of a variety of types of messages.

The rover 112 includes an antenna 115, one or more processors 113, and a memory 114. The one or more processors 113 determine positions based on the timing of codes and carriers in the received satellite signals received at antenna 115 as known by those skilled in the art. The one or more processors 113 execute a pierce point calculation subsystem 117 configured to operate in accordance with one or more embodiments described herein. The memory 114 may store the phase scintillation map generated by and received from the central server 124, as described in further detail below.

Figure 2:
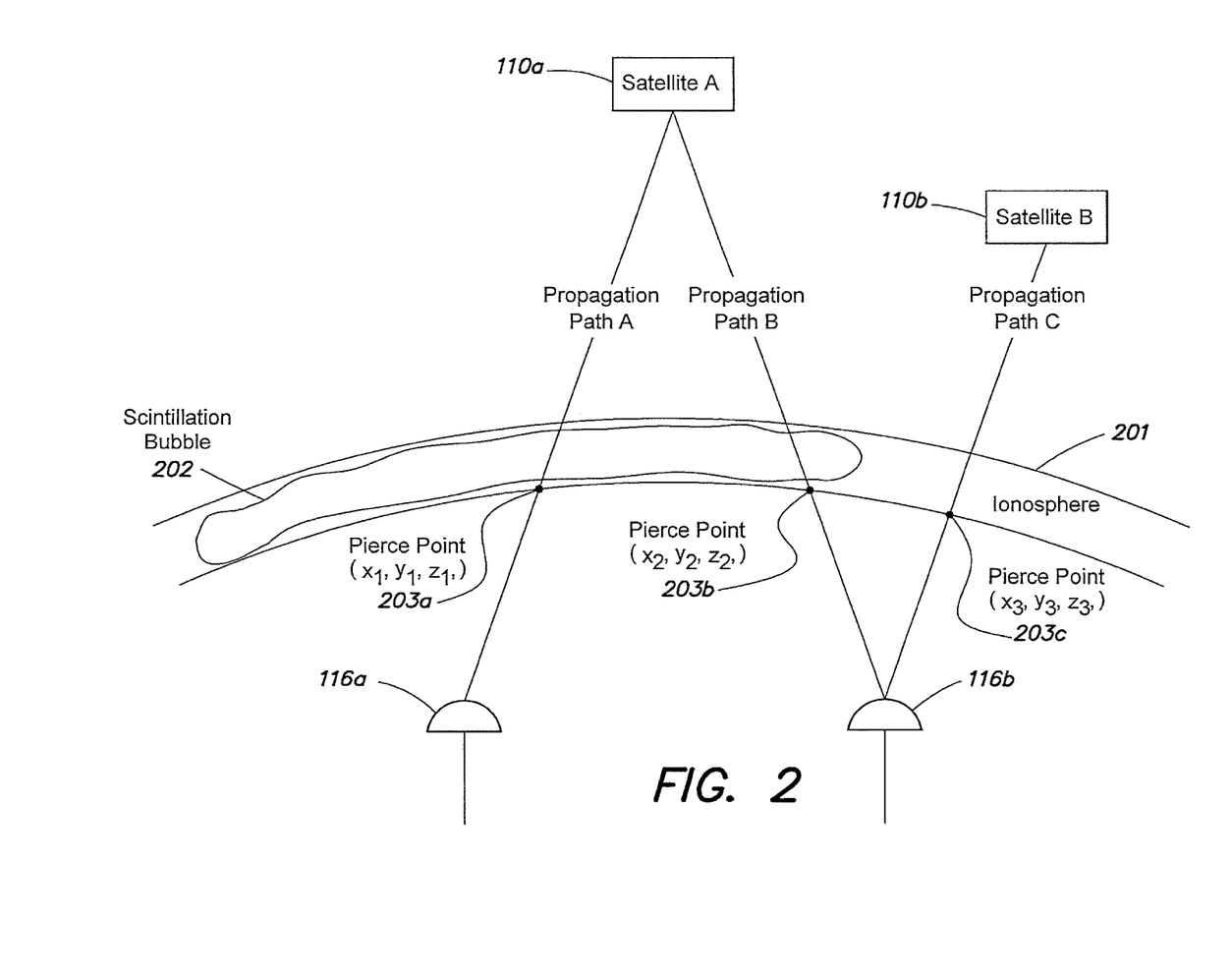
FIG. 2 illustrates an exemplary environment in which the system of FIG. 1 may operate.

FIG. 2 shows an environment in which the system of FIG. 1 may operate. As depicted in FIG. 2, a GNSS satellite 110a (hereinafter "Satellite A") is in view of base stations 116a and 116b, and a GNSS satellite 110b (hereinafter "Satellite B") is in view of base station 116b. In the example as depicted in FIG. 2, Satellite B is not in view of the base station 116a. The signals transmitted by Satellite A and Satellite B are indicated by the lines labeled as propagation paths A, B, and C in FIG. 2. Although Satellite A is at a higher elevation than Satellite B in FIG. 2, the satellite signals transmitted by Satellite A and received by the base stations 116a and 116b are adversely affected by ionospheric scintillation of the scintillation bubble 202, while the signals transmitted by Satellite B and received by the base station 116b are not adversely affected by ionospheric scintillation of the scintillation bubble 202.

Specifically, scintillation bubble 202, which is in the signal paths from Satellite A to the respective base stations 116a and 116b subjects the signals to ionospheric scintillation. As such, the signals from Satellite A to the base stations 116a and 116b interact with free electrons of the scintillation bubble 202 along the associated propagation paths (e.g., propagation paths A and B), causing phase errors, rapid phase fluctuations and/or signal power fading in the received signals, which may result in cycle slips and possible loss of lock at the receiver and lead to a degradation in overall positioning accuracy.

In operation, the respective base stations 116a and 116b measure TEC and analyze amplitude and phase measurements to calculate the S4 and/or the $\sigma_\varphi$ values for each of the satellite signals received from respective GNSS satellites at one or more different frequencies (e.g., L1, L2, and L5). Using one or more of the S4, and $\sigma_\varphi$, and TEC values the base station 116 then determines the extent of adverse effect of ionospheric scintillation on the satellite signals. A determination of low or minimal S4 values (e.g., 0.03 or lower) or low or minimal $\sigma_\varphi$ values (e.g., 0 radian or 0.1 radian), alone or in combination with the TEC value, may indicate that the satellite signals received from a particular GNSS satellite are not being adversely affected by ionospheric scintillation (i.e., weak or no ionospheric scintillation). Small S4 values (e.g., between 0.4 and 0.6) or $\sigma_\varphi$ values (e.g., between 0.2 to 0.9 radian) alone or in combination with the TEC value may indicate that the satellite signals from a particular GNSS satellite are being adversely affected, to a small extent, by ionospheric scintillation (i.e., weak ionospheric scintillation). Large S4 values (e.g., 0.6 or higher) or $\sigma_\varphi$ values (e.g., 1 radian or higher) alone or in combination with the TEC value may indicate that the satellite signals from a particular GNSS satellite are being adversely affected, to a large extent, by ionospheric scintillation (i.e., strong ionospheric scintillation). Therefore, as the S4 or the $\sigma_\varphi$ value increase, the ionospheric monitoring subsystem 120 of the base station 116 determines that the adverse effect of ionospheric scintillation on the signals from the GNSS satellite is getting stronger.

In accordance with one or more embodiments described herein, the base station 116 may assign a particular index value of an index scale to a particular GNSS satellite 110 based on the calculated S4 or the $\sigma_\varphi$ value alone or in combination with the TEC value. For example, if the index scale is 0 to 5, the ionospheric monitoring subsystem 120 of the base station 116 may assign an index value of 0 when the S4 or the $\sigma_\varphi$ value alone or in combination with the TEC value is equal to or below a lower threshold value, indicating that the satellite signals from a particular GNSS satellite are not being adversely affected by ionospheric scintillation (i.e., no ionospheric scintillation). In the example, an exemplary lower threshold value may be 0.3 for S4 and 0.1 radians for $\sigma_\varphi$. In addition, the ionospheric monitoring subsystem 120 of the base station 116 may assign an index value of 5 when the S4 or the $\sigma_\varphi$ value alone or in combination with the TEC value is equal to or greater than a higher threshold value, indicating that the signals from the GNSS satellite are being adversely affected, to a large extent, by ionospheric scintillation (i.e., strong ionospheric scintillation). In the example, an exemplary higher threshold value may be 0.6 for S4 and 1 radian for $\sigma_\varphi$.

Further, for any S4 or the $\sigma_\varphi$ value alone or in combination with the TEC value that are between the lower and higher threshold values, indicating that the signals from the GNSS satellite are being adversely affected, to a certain extent, by ionospheric scintillation, the ionospheric monitoring subsystem 120 of the base station 116 may respectively assign different index values of 1, 2, 3, or 4. For example, if the S4 or the $\sigma_\varphi$ value alone or in combination with the TEC value is close to and above the lower threshold value, the ionospheric monitoring subsystem 102 may assign an index value of 1 to the GNSS satellite (i.e., weak ionospheric scintillation). Similarly, if the S4 or the $\sigma_\varphi$ value alone or in combination with the TEC value is close to yet still below the higher threshold value, the ionospheric monitoring subsystem 120 may assign an index value of 4 to the GNSS satellite. As such, the assigned index values indicate to what extent the satellite signals from a particular GNSS satellite are adversely affected by ionospheric scintillation. In addition, and in a known manner, the base station 116 may determine the coordinates of a pierce point (e.g., x, y, and/or z coordinates where the satellite signals of a particular GNSS satellite to the base station intersects with the ionosphere) for each GNSS satellite in view of the base station 116.

Thus, the base stations 116a and 116b assign index values to each GNSS satellite in view and determine coordinates for corresponding pierce points for each GNSS satellite. The use of an index scale from 0 to 5 with respect to FIG. 2 is for illustrative purposes and it is expressly contemplated than any scale may be utilized and any values or indicators may be assigned to the GNSS satellites to indicate to what extent the satellite signals from the GNSS satellites are being adversely affected by ionospheric scintillation based on the calculated S4 or the $\sigma_\varphi$ value alone or in combination with the TEC value.

In the example as depicted in FIG. 2, the scintillation bubble 202 of the ionosphere 201 is in the path (e.g., propagation path A) of the satellite signals transmitted by Satellite A and received by the base station 116a. Further and in this example, the S4 or the $\sigma_\varphi$ value determined by base station 116a based on the satellite signals received from Satellite A at the L1 frequency is greater than the higher threshold value. Thus, the ionospheric monitoring subsystem 120 of base station 116a assigns an index value of 5 to Satellite A. In addition, the processor 118 of base station 116a determines the coordinates for pierce point 203a, where the coordinates indicate where the satellite signals (indicated by propagation path A) from Satellite A intersect with the ionosphere 201. Specifically, the processor 118 of base station 116a determines coordinates for pierce point 203a to be $x_1$, $y_1$, and $z_1$.

Further and based on the example as depicted in FIG. 2, the scintillation bubble 202 of the ionosphere 201 is in the path (e.g., propagation path B) of the satellite signals transmitted by Satellite A and received by the base station 116b. In addition and for this example, the S4 or the $\sigma_\varphi$ value determined by base station 116b based on the satellite signals received from Satellite A at the L1 frequency is between the lower threshold value and the higher threshold value. Thus, the ionospheric monitoring subsystem 120 of base station 116b may assign an index value of 3 to Satellite A based on the satellite signals from GNSS satellite 110 passing through the scintillation bubble 202 at a particular point with relation to the center and edge of the scintillation bubble 202. In addition, and in a known manner, the processor 118 of base station 116b determines the coordinates for pierce point 203b to be the $x_2$, $y_2$, and $z_2$.

In addition and based on the example as depicted in FIG. 2, the scintillation bubble 202 of the ionosphere 201 is not in the path (e.g., propagation path C) of the signals transmitted from Satellite B and received by the base state 116b at the L1 frequency. Thus, and based on the calculated S4 or $\sigma_\varphi$ value being less than or equal to the lower threshold value, the ionospheric monitoring subsystem 120 of base station 116b assigns an index value of 0 to Satellite B. In addition, and in a known manner, the processor 118 of base station 116b determines the coordinates for pierce point 203c to be $x_3$, $y_3$, and $z_3$.

Although FIG. 2 depicts Satellite A being in view of base stations 116a and 116b and Satellite B being in view of only base station 116b, it is expressly contemplated that any number of GNSS satellites may be in view of each base station, and the base stations may assign particular index values to each of the GNSS satellites in view of the base stations, in a similar manner as described herein.

Base stations 116a and 116b may then transmit one or more values and identifiers to the central server 124 for inclusion in, for example, the table 300. Specifically, the values and identifiers transmitted from base stations 116a and 116b to the central server 124, may include, but are not limited to, a base station identifier, a GNSS satellite identifier, a pierce point location (e.g., coordinates values), an assigned index value, and the frequency being tracked. For example, base stations 116a and 116b may broadcast the values and identifiers to the central server 124.

FIG. 3 depicts the table 300 that may be used to store the particular values and identifiers transmitted from the base station 116 to the central server 124. The table 300 may be stored in the memory 132 of the central server 124 and/or storage (not shown) coupled to the central server 124. It should be noted that the use of a table is for illustrative purposes, and in alternative embodiments a different data container or structure may be utilized. The table 300 may include a base station identifier column 302, a GNSS satellite identifier column 304, a pierce point location column 306, an assigned index value column 308, and a frequency column 310. The base station identifier column 302 may store an identifier that uniquely identifies a base station. The GNSS satellite identifier column 304 may store an identifier that uniquely identifies a GNSS satellite. The pierce point location column 306 may store the x, y, and/or z coordinates determined for a pierce point. The assigned index value column 308 may store an index value assigned to a GNSS satellite by a base station, and the frequency column 310 may store the frequency being tracked by a base station when the base station calculates the S4 or the $\sigma_\varphi$ value alone or in combination with the TEC value.

For example, the table 300 may store the values determined and assigned as described above in reference to the example in FIG. 2. Specifically, the base station identifier column 302 may store a base station identifier of "Base Station A" for base station 116a. In addition, and in a corresponding row entry, the GNSS satellite identifier column 304 may store a GNSS identifier of "Satellite A" for GNSS satellite 110a. Further, in another corresponding row entry, the pierce point location column 306 may store $x_1$, $y_1$, and $z_1$ coordinates for pierce points 203a. In another corresponding row entry, the assigned index value column 308 may store the index value of 5 assigned by base station 116a indicating that the signals from Satellite A are being adversely affected, to a large extent, by ionospheric scintillation. Finally, in another corresponding row entry, the frequency column 310 may store the value of L1 indicating the frequency being tracked by base station 116a.

In a different row, the base station identifier column 302 may store a base station identifier of "Base Station B" for base station 116b. In addition, and in a corresponding row entry, the GNSS satellite identifier column 304 may store a GNSS identifier of "Satellite A" for GNSS satellite 110a. Further, in another corresponding row entry, the pierce point location column 306 may store $x_2$, $y_2$, and $z_2$ coordinates for pierce points 203b. In another corresponding row entry, the assigned index value column 308 may store the index value of 3 assigned by base station 116b indicating that the satellite signals from Satellite A are being adversely affected by ionospheric scintillation. Finally, in another corresponding row entry, the frequency column 310 may store the value of L1 indicating the frequency being tracked by base station 116b.

Similarly and in another different row, the base station identifier column 302 may store a base station identifier of "Base Station B" for base station 116b. In addition, and in a corresponding row entry, the GNSS satellite identifier column 304 may store a GNSS identifier of "Satellite B" for GNSS satellite 110b. Further, in another corresponding row entry, the pierce point location column 306 may store $x_3$, $y_3$, and $z_3$ coordinates for pierce points 203c. In another corresponding row entry, the assigned index value column 308 may store the index value of 0 assigned by base station 116b indicating that the satellite signals from Satellite B are not being adversely affected by ionospheric scintillation. Finally, in another corresponding row entry, the frequency column 310 may store the value of L1 indicating the frequency being tracked by base station 116b.

Thus, and as more base stations 116 provide assigned values and information to the central server 124, the central server 124 may store those values in the table 300 to more accurately determine the extent of ionospheric scintillation in the ionosphere and more accurately determine where the scintillation bubbles are located. It is noted that the values stored in the table 300 are for illustrative purposes and other and/or differing values may be stored in the table 300. For example, although reference is made to base stations 116a assigning a particular index value to Satellite A, it expressly contemplated that base station 116a may assign any of a variety of values or indicators to one or more other satellites 110 in view of base station 116a to be stored in the table 300. In addition, although reference is made to base stations 116a and 116b tracking the L1 frequency, it is expressly contemplated that base stations 116a and 116b may track other frequencies or a plurality of frequencies (e.g., L2, L5, etc.).

FIG. 4 is a phase scintillation map 400 generated in accordance with one or more embodiments described herein. Specifically, the processor 130 of the central server 124 executes the phase scintillation map generator subsystem 134 to utilize the values stored in the table 300 to generate the phase scintillation map 400. More specifically, and by utilizing the location of the pierce points 203 together with the identifiers and index value assigned to given GNSS satellites in view of a base station 116 and stored in table 300, the phase scintillation map generator subsystem 134 may generate the phase scintillation map 400 indicating where the scintillation bubbles are located.

For example, a first, second, and third base station 116 may all have a view of a given GNSS satellite and the three base stations may respectively assign index values of 1, 5, and 1 to the given GNSS satellite 110 in the manner described above. In addition, the first base station may have an associated pierce point 404a at a first set of coordinates, the second base station may have an associated pierce point 404b at a second set of coordinates, and the third base station may have an associated pierce point 404c at a third set of coordinates. Therefore, the phase scintillation map generator subsystem 134 may determine that scintillation bubble 402a has its center at the coordinates associated with the second pierce point 404b that was assigned a value of 5, and that scintillation bubble 402a attenuates or has its edge at the coordinates associated with the first pierce point 404a and third pierce point 404c that were assigned an index value of 1. Therefore, ionospheric scintillation at the center of scintillation bubble 402a is strong, while ionospheric scintillation at the edges of scintillation bubble 402a is weak.

Alternatively, and if the first and third base stations both assigned index values of 5, the scintillation bubble 402a may be at the same location and may have the same shape and size, however ionospheric scintillation would be uniform and strong at the center and at the edges of scintillation bubble 402a.

FIG. 4 shows phase scintillation map that includes the scintillation bubble 402a and also includes a second scintillation bubble 402b. The scintillation bubbles 402a and 402b are positioned at particular points with respect to True North (hereinafter "N") 404. Although the phase scintillation map 400 as depicted in FIG. 4 includes two scintillation bubbles 402a and 402b, it is expressly contemplated that the phase scintillation map 400 may include any number of scintillation bubbles that may be of any shape and size, and may be located anywhere on the phase scintillation map 400 based on the values received from the one or more base stations 116 and stored in the table 300. In addition, it is expressly contemplated that a single phase scintillation map 400 may be generated for each frequency or a single phase scintillation map 400 may be generated for a plurality of frequencies. As such, the example as described with respect to FIG. 4 is for illustrative purposes, and any assigned index values, identifiers, and pierce point locations may be utilized to determine the shape, size and location of a scintillation bubble.

In addition, it is noted that scintillation bubbles are not stationary and move through the ionosphere over time. As such, the phase scintillation map 400 may be updated at one or more particular times to account for the movement of the scintillation bubbles.

The central server 124 may then transmit the phase scintillation map 400 to one or more rovers 112. Each rover 112 may utilize the phase scintillation map 400 to determine if a pierce point determined by the rover for a given GNSS satellite in view of the rover 112 falls within the boundaries of a scintillation bubble of the phase scintillation map 400. For example, the pierce point calculation subsystem 117 of the rover 112 may determine that the coordinates of a pierce point, associated with the given GNSS satellite in view of the rover 112, are $x_4$, $y_4$, and $z_4$. The pierce point calculation subsystem 117 may then compare the coordinates of the pierce point with the locations of scintillation bubbles 402a and 402b to determine if the coordinates fall within the boundaries of scintillation bubble 402a or 402b of the phase scintillation map 400.

If the rover 112 determines that the coordinates of the pierce point (e.g., $x_4$, $y_4$, and $z_4$) associated with a given GNSS satellite fall within the boundaries of scintillation bubble 402a or 402b of the phase scintillation map 400, the pierce point calculation subsystem 117 may de-weight the satellite signal observations (e.g., pseudorange measurements and phase measurements) for the given GNSS satellite. For example, the pierce point calculation subsystem 117 may assign a weight of 0 to the satellite signal observations for the given GNSS satellite. In addition, the pierce point calculation subsystem 117 may assign a weight of 1 to the satellite signal observations for a given GNSS satellite that has a corresponding pierce point that falls outside of the boundaries of scintillation bubble 402a or 402b of the phase scintillation map 400. As such and when performing position calculations, the satellite signal observations for GNSS satellites that have corresponding pierce points that fall outside the boundaries of a scintillation bubble (i.e., the satellite signal observations that are assigned a weight of 1) are utilized instead of or prioritized over the satellite signal observations for the GNSS satellites that have corresponding pierce points that fall within the boundaries of a scintillation bubble (i.e., the satellite signal observations that are assigned a weight of 0).

In an alternative embodiment, the rover 112 may assign a particular weight to the satellite signal observations for a given GNSS satellite based on the pierce point being located at a particular position within scintillation bubble of the phase scintillation map. For example and assuming a scale of 0 to 1, the rover 112 may assign a weight of 0 to the satellite signal observations for the given GNSS satellite if the pierce point associated with the given GNSS satellite is located at a position within scintillation bubble 402a or 402b where there is strong ionospheric scintillation (e.g., at the center of scintillation bubble 402a of the phase scintillation map 400). In addition, the rover 112 may assign a weight of 0.5 based on the pierce point being positioned somewhere between the center and edge of scintillation bubble 402a or 402b of the phase scintillation map 400. Further, the rover 112 may assign a weight of 1 based on pierce point being outside of scintillation bubble 402a or 402b of the phase scintillation map 400. As such and when performing position calculations, satellite signal observations for GNSS satellites associated with no ionospheric scintillation or weak ionospheric scintillation may be prioritized over satellite signal observations for GNSS satellites associated with strong ionospheric scintillation.

Although reference is made to assigning particular weights to the satellite signal observations to de-weight the satellite signal observations, it is expressly contemplated that the satellite signal observations, for a given GNSS satellite having a corresponding pierce point within a scintillation bubble of a phase scintillation map, may be de-weighted in any of a variety of ways and as known by those skilled in the art.

Figure 5:
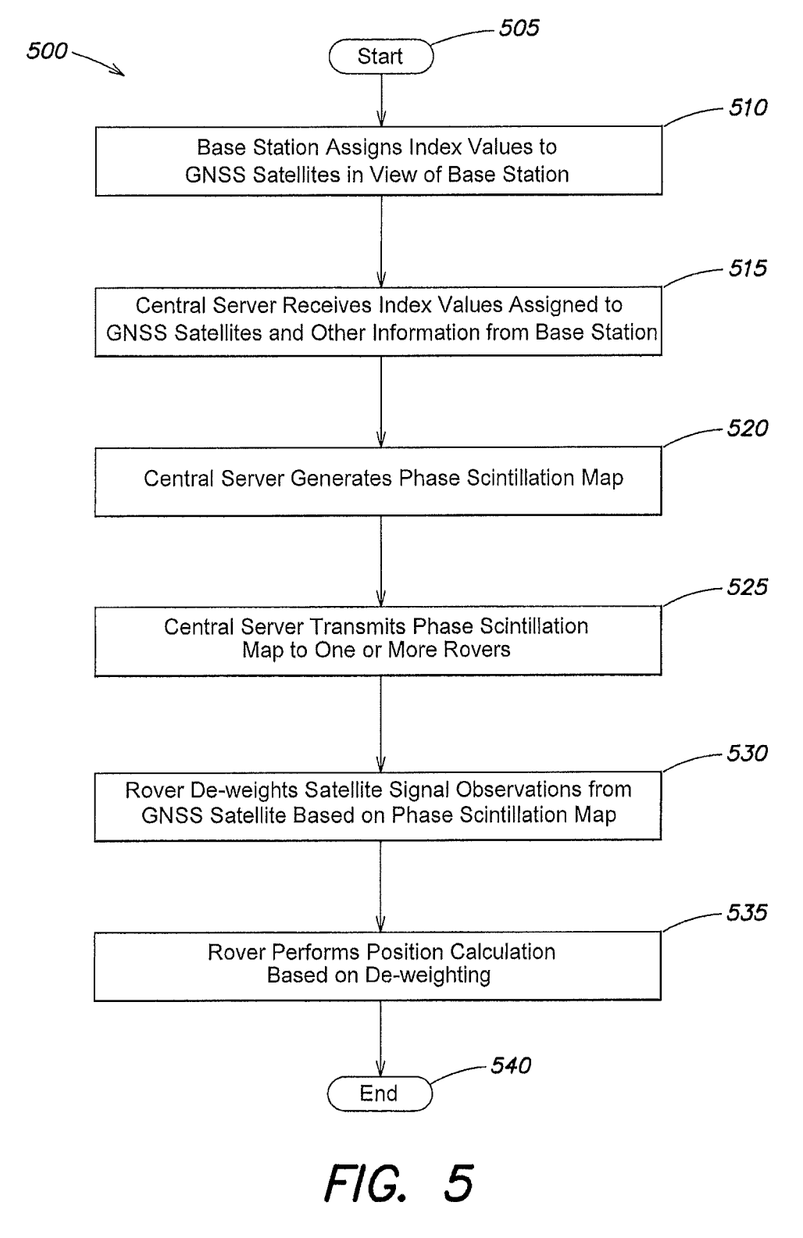
FIG. 5 is an exemplary flow chart for the operation of the systems of FIG. 1.

FIG. 5 is an exemplary flow chart of the operation of the system and method for generating a phase scintillation map utilized for de-weighting satellite signal observations. The procedure 500 starts at step 505 and continues to step 510, where one or more base stations assign an index value to GNSS satellites in view of the base station. Specifically, the ionospheric monitoring subsystem 120 of the base station 116 assigns a value to each GNSS satellite 110 in view of the base station 116 based on the calculated S4 or the $\sigma_\varphi$ value alone or in combination with the TEC value. The index value assigned to each GNSS satellite indicates the severity of the adverse effects of ionospheric scintillation on satellite signals transmitted by the GNSS satellite.

The procedure continues to step 515 where a central server receives the index values assigned to the GNSS satellites and other information from the one or more base stations. The other information may include, but is not limited to, a unique identifier identifying the base station, a unique identifier for the GNSS satellite in view of the base station, coordinates for the pierce point associated with the GNSS satellite in view of the base station, and the frequency being tracked by the base station. The assigned index values and other information may be stored in table 300.

The procedure continues to step 520 where the central server generates a phase scintillation map utilizing the received index values and other information. Specifically, the phase scintillator map generator subsystem 134 generates a phase scintillation map 400 that includes one or more scintillation bubbles, wherein the location of the respective scintillation bubbles are based on the received assigned index values and the other information.

The procedure continues to step 525 where the phase scintillation map is transmitted to one or more rovers. For example, the central server 124 broadcasts the phase scintillation map 400 to one or more rovers 112. The procedure continues to step 530 where satellite signal observations are de-weighted based on the phase scintillation map. Specifically, the satellite signal observations are de-weighted should the rover determine that one or more pierce points, determined for one or more GNSS satellites in view of the rover, fall within the boundaries of the scintillation bubbles on the phase scintillation map.

More specifically, the pierce point calculation subsystem 117 of the rover 112 determines the coordinates for a pierce point associated with a given GNSS satellite in view of the rover 112. The pierce point calculation subsystem 117 then compares the coordinates of the pierce point with the location of the scintillation bubbles on the phase scintillation map to determine if the coordinates fall within the boundaries of a scintillation bubble. If the coordinates of the pierce point associated with the given GNSS satellite fall within the boundaries of a scintillation bubble of the phase scintillation map 400, the satellite signal observations from the given GNSS satellite are de-weighted.

For example, the satellite signal observations from the given GNSS satellite having a corresponding pierce point that falls within the boundaries of a scintillation bubble of the phase scintillation map may be assigned a particular weight less than 1, or less than a maximum weight, to de-weight the satellite signal observations for use in position calculations.

The procedure continues to step 535 where the rover performs position calculations based on the de-weighting of the satellite signal observations. Therefore and when performing position calculations, the satellite signal observations for GNSS satellites that have corresponding pierce points that fall outside the boundaries of a scintillation bubble are utilized instead of or prioritized over the satellite signal observations for the GNSS satellites that have corresponding pierce points that fall within the boundaries of a scintillation bubble.

The foregoing description described certain example embodiments. It will be apparent, however, that other variations and modifications may be made to the described embodiments, with the attainment of some or all of their advantages. For example, although reference is made to the central server receiving the assigned index values and other information from the base stations to generate the phase scintillation map, it is expressly contemplated that a selected base station may receive the assigned index values and other information from other base stations and the selected base station may generate the phase scintillation map and transmit the phase scintillation map to the one or more rovers in the manner described above. In addition, the base stations 116 may send the S4, the $\sigma_\varphi$, and/or the TEC values to the central server 112 and the central server 124 may assign an index value and calculate a pierce point for the base station 116 in the manner described above. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. A system, comprising:
   a processor and a memory, the processor configured to:
      receive, from at least one base station, one or more index values where each index value is assigned to a corresponding global navigation satellite system (GNSS) satellite in view of the at least one base station, wherein the index value indicates an adverse effect of ionospheric scintillation on satellite signals transmitted by the corresponding GNSS satellite,
      receive, from the at least one base station, coordinates of one or more pierce points, wherein the coordinates of each pierce point indicate an intersecting location of the satellite signals transmitted by the corresponding GNSS satellite and the ionosphere,
      generate a phase scintillation map that includes one or more scintillation bubbles, wherein a location of each scintillation bubble on the phase scintillation map is based on the one or more index values and the coordinates of the one or more pierce points received from the at least one base station; and
      transmit the phase scintillation map to one or more rovers for use in prioritizing observations.

2. The system of claim 1, wherein the index value assigned to the corresponding GNSS satellite is based on at least one of an amplitude scintillation index (S4) value and a phase scintillation index ($\sigma_\varphi$) value calculated from amplitude measurements and phase measurements made at the at least one base station based on the satellite signals transmitted by the corresponding GNSS satellite.

3. The system of claim 2, wherein as the S4 value or the $\sigma_\varphi$ value increases, the processor is further configured to determine that the adverse effect of ionospheric scintillation on the satellite signals is getting stronger.

4. The system of claim 1, wherein the processor is further configured to receive, from the at least one base station, an identifier that uniquely identifies the at least one base station and an identifier that uniquely identifies the corresponding GNSS satellite.

5. The system of claim 4, wherein a table is stored in the memory, wherein an entry of the table is configured to store the index value assigned to the corresponding GNSS satellite, the coordinates of the pierce point associated with the corresponding GNSS satellite, the identifier that uniquely identifies the at least one base station, and the identifier that uniquely identifies the corresponding GNSS satellite.

6. The system of claim 1, wherein each rover de-weights observations from one or more selected GNSS satellites to prioritize observations utilizing the scintillation map.

7. The system of claim 6, wherein the observations are de-weighted if a rover pierce point falls within boundaries of the one or more scintillation bubbles of the phase scintillation map.

8. The system of claim 1, wherein the one or more index values are received in one or more broadcast messages.

9. A method comprising:
   receiving, at a server having a processor and a memory, one or more index values from at least one base station, wherein each index value is assigned to a corresponding global navigation satellite system (GNSS) satellite in view of the at least one base station, and wherein the index value indicates an adverse effect of ionospheric scintillation on satellite signals transmitted by the corresponding GNSS satellite,
   receiving, at the server, coordinates of one or more pierce points from the at least one base station, wherein the coordinates of each pierce point indicate an intersecting location of the satellite signals transmitted by the corresponding GNSS satellite and the ionosphere,
   generating, by the processor of the server, a phase scintillation map that includes one or more scintillation bubbles, wherein a location of each scintillation bubble on the phase scintillation map is based on the one or more index values and the coordinates of the one or more pierce points received from the at least one base station; and
   transmitting the phase scintillation map to one or more rovers for use in prioritizing observations.

10. The method of claim 9, wherein the index value assigned to the corresponding GNSS satellite is based on at least one of an amplitude scintillation index (S4) value and a phase scintillation index ($\sigma_\varphi$) value calculated from amplitude measurements and phase measurements made at the at least one base station based on the satellite signals transmitted by the corresponding GNSS satellite.

11. The method of claim 10, wherein as the S4 value or the $\sigma_\varphi$ value increases, it is determined that the adverse effect of ionospheric scintillation on the satellite signals is getting stronger.

12. The method of claim 9, further comprising receiving, from the at least one base station, an identifier that uniquely identifies the at least one base station and an identifier that uniquely identifies the corresponding GNSS satellite.

13. The method of claim 12, wherein a table is stored in the memory, wherein an entry of the table is configured to store the index value assigned to the corresponding GNSS satellite, the coordinates of the pierce point associated with the corresponding GNSS satellite, the identifier that uniquely identifies the at least one base station, and the identifier that uniquely identifies the corresponding GNSS satellite.

14. The method of claim 9, wherein each rover de-weights observations from one or more selected GNSS satellites to prioritize the observations utilizing the scintillation map.

15. The method of claim 14, wherein the observations are de-weighted if a rover pierce point falls within boundaries of the one or more scintillation bubbles of the phase scintillation map.

16. The method of claim 9, wherein the one or more index values are received in one or more broadcast messages.

* * * * *